Figure 1:
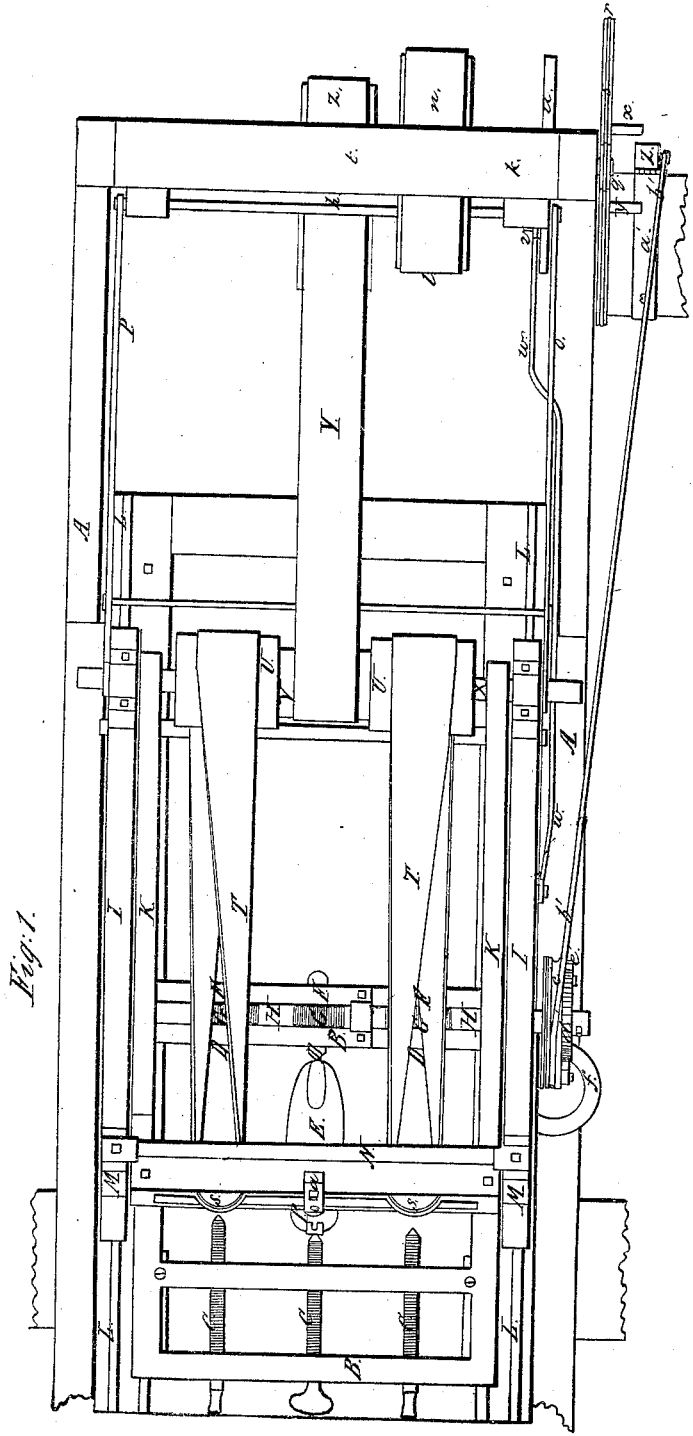

Sheet 1 – 3 Sheets

J. M. Eddy,
Shaping Lasts,
Nº 6,134.      Patented Feb. 20, 1849.

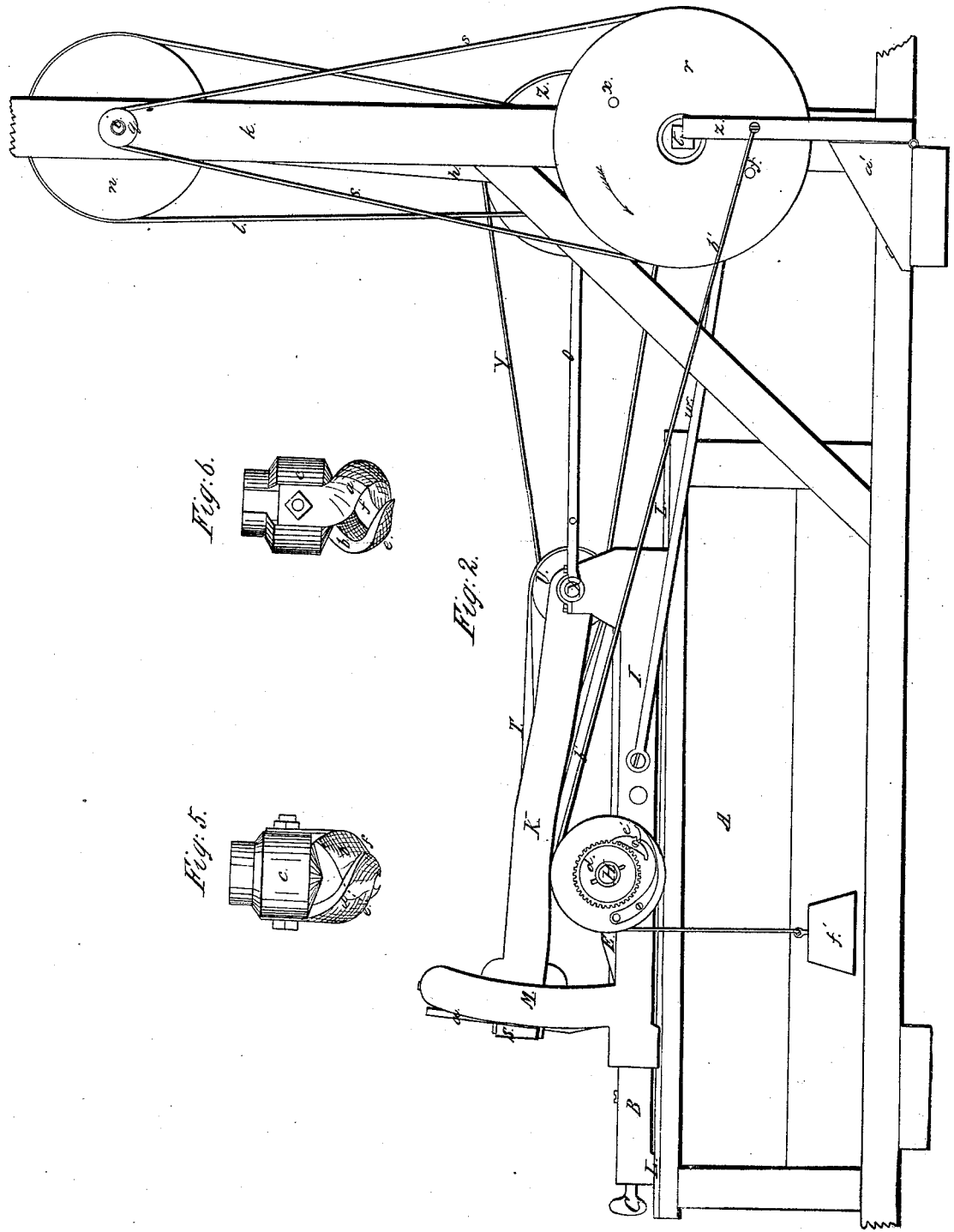

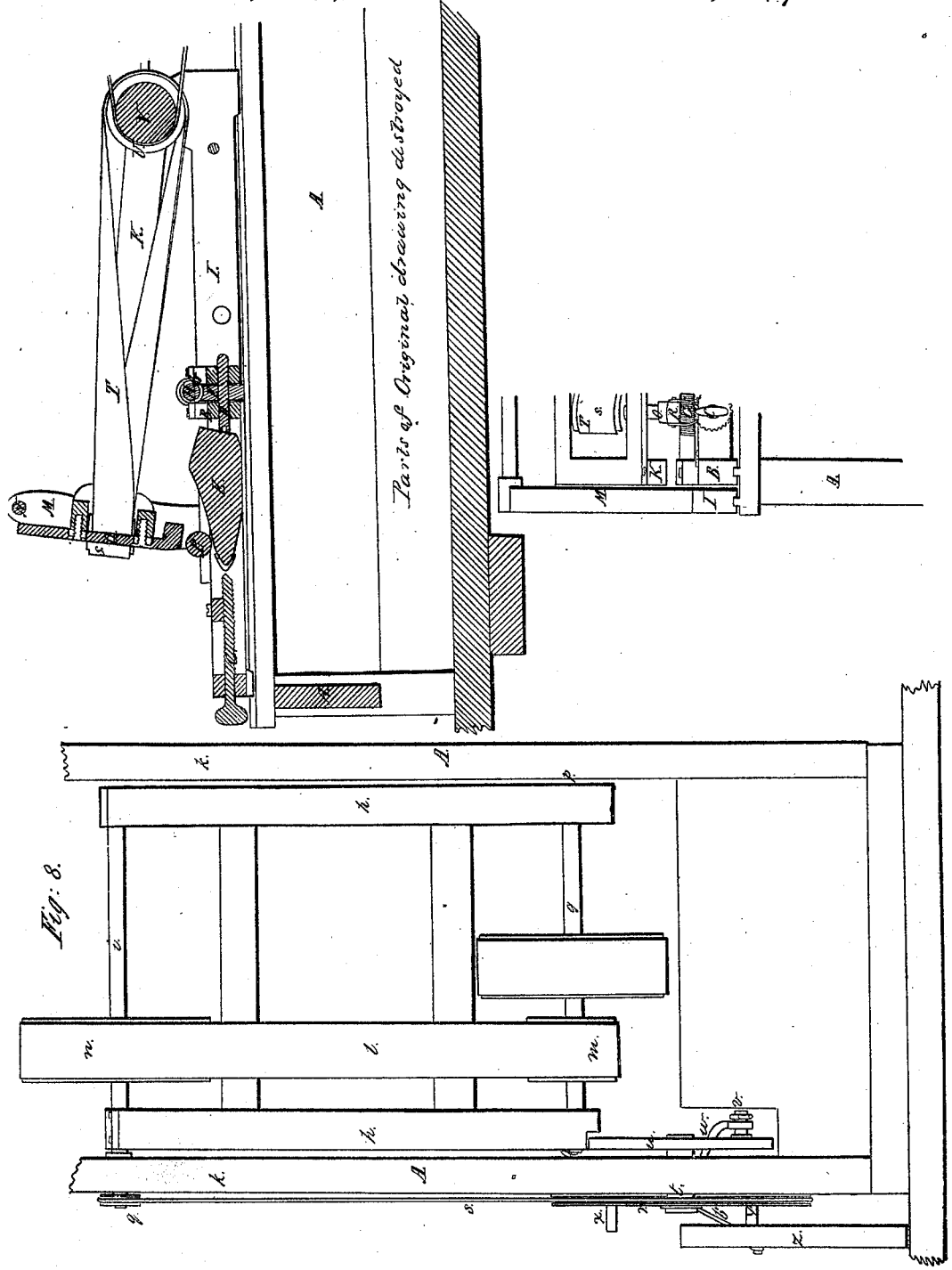

UNITED STATES PATENT OFFICE.

JAS. M. EDDY, OF BOSTON, MASSACHUSETTS, ASSIGNOR TO JNO. KIMBALL.

MACHINERY FOR TURNING IRREGULAR FORMS.

Specification of Letters Patent No. 6,134, dated February 20, 1849.

*To all whom it may concern:*

Be it known that I, JAMES M. EDDY, of Boston, in the county of Suffolk and State of Massachusetts, have made an invention of certain new and useful machinery for manufacturing or shaping lasts or various other articles capable of being reduced to shape thereby; and I do hereby declare that the same is fully represented and described in the following specification and accompanying drawings, letters, figures, and references thereof.

Of the said drawings, Figure 1, denotes a top view of my machine, Fig. 2, is a side elevation of it, Fig. 3, is a front end view, and Fig. 4 is a vertical central and longitudinal section of it.

In the said drawings, A, represents the main supporting frame of the machine constructed in any suitable manner and of any proper material. On the top of said frame a rectangular frame B, is arranged and fixed, in the position as seen in the drawings, the said frame being the mandrel and pattern frame. At one or its front end it supports a series of horizontal centers or center screws C, C, C, and in line with them respectively and at the opposite end of it, it carries a series of mandrels D, D, D. Each of said mandrels should have a dog or some suitable substitute affixed upon its inner end or that end which is nearest to its center screw C, the said dog or substitute being for the purpose of so attaching or confining the mandrel to a pattern, last, or a piece of wood to be reduced to the shape of the pattern, as to cause said piece of wood or pattern to be rotated with and by the mandrel and to the same extent as the mandrel is rotated, when the latter is put in revolution on its axis.

The middle center screw C, and the middle mandrel D, sustains or carries the pattern last E. Between and to each of the other mandrels and its center screw, a block or piece of wood to be reduced to the shape of the pattern last should be affixed.

Each mandrel has a gear wheel F, fixed upon it, which is made to engage with one of three endless worms or screws G, G, G, fixed and arranged on a horizontal shaft H, supported by and so as to be revolved in proper boxes and disposed as seen in the drawings. When said shaft is put in rotation or partial rotation, all the mandrels are simultaneously rotated by it.

In connection with the above described machinery, I use what may be termed the cutter carriage. It consists of two frames I, K. The former of said frames is supported on and so as to be moved longitudinally back and forth on two parallel rails L, L. The other frame is jointed or hinged to the frame I, at their rear ends, and so as to permit the front end of the said frame K, to be raised up and down. The front end of the frame K, is supported by and between two curved guides M, M, which are made to project upward from the frame I, and are connected together at their upper ends by a transverse bar or rod N.

The front end of the frame K, supports and carries a series of upright mandrels O, O, and a guide spherical wheel or ball P. Each of the mandrels O, is placed in a vertical plane passing through it and the axes of the mandrel D, and its center screw C, as seen in the drawings. The guide sphere or ball P, is placed directly over the pattern, and is fixed to the lower end of a slide bar Q, which is secured to the frame K, by screws or other contrivances which permit of the proper adjustment of the guide ball or sphere with respect to the cutters. The said sphere or ball P, is supported on journals so as to be capable of revolving in a vertical plane when it is made to move in contact with and from end to end of the pattern.

Each of the mandrels O, O, supports and has fixed to its lower end a peculiar hemispherical cutting tool R. A front view of said cutting tool on an enlarged scale is represented in Fig. 5; a side view of it in Fig. 6, and a bottom or underside view of it in Fig. 7. It is composed of two curved cutters $a$, $b$, whose cutting edges $e$, $f$, or cutting edges $e$, $f$, and external surfaces are disposed in and make part of the surface of a hemisphere made to correspond in diameter with that of the rotating pattern sphere. The two cutters $a$ $b$, are fastened to a cutter head or cylinder $c$, which is screwed upon or otherwise properly fixed to the lower end of the mandrel, so that when said mandrel is revolved about its own axis said cutters are made to revolve with it.

Each mandrel O, has a pulley S, fixed upon it as seen in the drawings. Around said pulley an endless crossed belt T, passes to and about a drum U, of a series of three drums U, V, U, placed upon the transverse shaft X, on which the frame K, works. From and around the middle drum or pulley V of the shaft another endless belt Y, passes to and around a large wheel or pulley Z, fixed on a transverse horizontal shaft $g$, which is supported in bearings at the foot or lower end of a vibrating frame $h$, the said vibrating frame being sustained at its upper end on and by another horizontal shaft $i$, which may be termed the driving shaft and which is itself sustained by and so as to revolve in suitable boxes or bearings applied to a stationary gallows or upright frame K, see Figs. 1, 2, and 8, the latter being a rear elevation of the machine.

The shaft $g$, is put in revolution by an endless belt $l$, which plays around a pulley $m$, on said shaft and another pulley $n$, on the driving shaft. The lower end of the vibrating frame $h$, is connected to the movable frame I, by two rods O, P, which are jointed to both frames in such manner as to cause the frame $h$, to vibrate with a pendulous motion in accordance with the reciprocating rectilinear movement of the carriage I. Motion is given to the said carriage I, in the following manner. On the driving shaft $i$, there is a small pulley $q$, around which and another and larger pulley $r$, arranged as seen in the drawings, a belt $s$, passes or works so as to impart rotary motion to the pulley $r$, when the driving shaft is put in revolution. On the shaft $t$, of the pulley $r$, and inside of the frame, as seen in Figs. 1, and 8, there is a circular plate $u$, which has a crank pin $v$, projecting from its inner face. One end of a connecting rod $w$, is jointed to said crank pin, the other end of the rod being similarly jointed to the side of the carriage I, the said parts being so connected as to impart to the carriage I, and cutters and pattern sphere or rolls a reciprocating rectilinear motion when the driving shaft is put in revolution.

The next part of the mechanism to be described is that by which the pattern and blocks or pieces of wood supported by the mandrels are partially and simultaneously rotated on their axes, at the expiration of each forward or back movement of the cutter carriage I, the same being for the purpose of bringing a fresh portion of each block of wood, into the position to be operated on or chipped off by the cutting tool during its next succeeding movement in a longitudinal direction.

Two pins $x$, $y$, are made to project from the external face of the pulley $r$, as seen in the drawings. Said two pins operate in connection with an upright lever $z$, which turns on a fulcrum at its lower end, and in a plane parallel to the side of the machine, and when at rest, lies or is supported against a stop $a'$. A cord or band $b'$, extends from the said lever to and is wound several times around a pulley $c'$, which is made to play or turn loosely on the shaft H, before described. Said shaft H, has a ratchet or gear wheel $d'$, fixed upon it and close by the pulley $c'$, as seen in the drawings. A spring pawl or click $e'$, is affixed to the side of the pulley $c'$, and engages with the ratchet or gear $d'$, as seen in the drawings. A weight $f'$, is suspended on that end of the cord $b'$, which depends from the pulley $c'$.

During each entire revolution of the pulley $v$, the action of the two projections $x$, $y$, against the lever $z$, will be such as to twice move it away from and allow it to fall back against its stop $a'$. At each movement away from the stop the lever will draw upon the cord $b'$, and rotate the pulley $c'$, and thereby causes the weight $f'$, to rise upward and the spring pawl $e'$, to pass over several of the teeth of the ratchet wheel. As soon as the lever $z$, is permitted to fall toward its stop the weight $f'$, of the line or cord $b'$ is left free to fall and cause a return movement of the pulley $c'$, during which the pawl catches into the teeth of the ratchet wheel and partly rotates it and its shaft H, thereby causing the worms or screws G, G, G, to revolve and actuate the wheels F, F, F, so as to turn the mandrel to the extent required.

The cutting edges of the cutters should lie in a curved surface, made by the revolution on its transverse vertical axis of a semi section of the spheroid or curved pattern ball, whether said pattern ball be a sphere spheroid, ellipsoid or any other mathematical approximation or solid figure.

My machine differs materially from that invented and patented in the United States on the twentieth day of January, A. D. 1820, by one Thomas Blanchard, as said Blanchard's machine was a turning lathe, and produced a last or other article from a pattern during the continued uninterrupted and simultaneous revolution of a pattern and the block from which the article or resemblance of the pattern was to be made, said Blanchard's claims only covering such a combination of machinery as would operate in such manner. My machine does not so operate as the revolution of the pattern as well as that of the block to be reduced to shape is interrupted and only takes place partially and at certain intervals of time. Besides my machine does not cut the wood in a regular helix (or approximation thereto) around the axis of the wood as does said Blanchard's machine, but cuts in regular and successive lines or paths from end to end of the wood.

From the above description is will be seen too that my cutters and pattern guide roller or ball differs essentially from cutter wheels and pattern guide wheels such as are in use in the said last or gun stock turning lathe or machine of the said Blanchard. While the axis of revolution of said Blanchard's cutters is disposed in a line parallel with the turning axis of the article cut by them, the turning axis of my cutters is placed in a line perpendicular or inclined to the axis of the article cut. My cutters do not operate precisely as a cutter wheel would if placed over each of the blocks and made to revolve in the plane of the axis of the block. The cutters in such case would operate against the grain of the wood while revolving and going over it in one direction, and would be likely to occasionally lift or tear up or break the wood below the portions required to be removed. My improved cutters although moving in a straight line or path, rotate at the same time, in such manner as to cut the grain of the wood slantwise, or at right angles to it; and they do this in which ever the two ways they move over or upon the block they may be cutting.

I therefore claim—

1. The above described manner in which I construct and operate the cutters of my improved machine, the same being represented in Figs. 5, 6, and 7, not meaning to claim cutter wheels as made and operated in the manner adopted by the said Blanchard, or as made to rotate in vertical planes passing respectively through the axes of the blocks to be cut or reduced.

2. I also claim the vibrating frame $h$, its shaft pulleys and belts in combination with the driving shaft and its driving pulley, the cutter carriage and its drums or pulleys V, V, V, the whole being made to operate together substantially in manner and for the purpose of imparting to the cutters a continual revolving power during the reciprocating rectilinear movements of the cutter carriage as specified.

3. And furthermore I claim in combination with the mechanism as above described for cutting or reducing the wood or blocks as specified, the mechanism by which said wood or each block and the pattern are partially and simultaneously rotated at regular intervals of time, for the purpose of bringing the cutters to act on a fresh surface or surfaces of the wood or block; the said mechanism consisting of the gear wheels on the pattern and block mandrels, the worm gears or screws, the shaft H, the pulley $c'$, and spring pawls $e'$, the ratchet wheel, the weighted cord $b'$, lever $z$, stop $a'$, and projections $x$, $y$, from the pulley $r$, the whole being constructed and made to operate substantially as specified.

And although I have described and claimed certain improved mechanism I do not intend to confine or limit my invention to the precise form or forms as above specified but to vary the said form or forms in any manner and to any extent so long as I do not change the principle or principles of operation of my said improvement.

In testimony whereof I have hereto set my signature, this third day of April A. D. 1848.

JAMES M. EDDY.

Witnesses:
R. H. EDDY,
F. GOULD.